May 25, 1965 L. V. PELOSI 3,185,938
VFO CONTROL FOR GENERATING STABLE DISCRETE FREQUENCIES
Filed Feb. 27, 1962 3 Sheets-Sheet 1

INVENTOR.
LOUIS V. PELOSI
BY
ATTORNEY

May 25, 1965 L. V. PELOSI 3,185,938

VFO CONTROL FOR GENERATING STABLE DISCRETE FREQUENCIES

Filed Feb. 27, 1962 3 Sheets-Sheet 2

INVENTOR.
LOUIS V. PELOSI

BY

ATTORNEY

VFO CONTROL FOR GENERATING STABLE DISCRETE FREQUENCIES

Filed Feb. 27, 1962 3 Sheets-Sheet 3

INVENTOR.
LOUIS V. PELOSI
BY
ATTORNEY

United States Patent Office 3,185,938
Patented May 25, 1965

3,185,938

VFO CONTROL FOR GENERATING STABLE DISCRETE FREQUENCIES

Louis V. Pelosi, Oreland, Pa., assignor to the United States of America as represented by the Secretary of the Navy Filed Feb. 27, 1962, Ser. No. 176,162
1 Claim. (Cl. 331—11)
(Granted under Title 35, U.S. Code (1952), sec. 266)

The invention described herein may be manufactured and used by or for the Government of the United States of America for governmental purposes without the payment of any royalties thereon or therefor.

This invention relates to a frequency synthesizer and more particularly to a device for selecting and generating any desired frequency within a wide range of frequencies by a single variable frequency oscillator.

In the field of radio communications a limitation is imposed on a system's effectiveness by the number of output signal frequencies any given system is capable of providing. For example, in military communications where it is necessary for a large number of ships and aircraft to keep in constant communication with one another, a large number of signal frequencies must be generated for use with a single transmitter carried by an aircraft or small ship. The number of discrete, spurious signal free and accurately selectable channel frequencies obtainable directly from any type of oscillator is small. Since there is an urgent need for wide range, discrete and accurately selectable signal frequencies, various systems have been brought forth to supply the need.

At the present time there are two methods in general use for generating output signal frequencies for use in radio communications systems. The first system utilizes harmonic generations wherein harmonics and subharmonics of a standard oscillator are mixed together to provide multiple output signals harmonically related to the standard oscillator.

The second system employs a stabilized master oscillator in which the frequency of a master oscillator is controlled by reference signals from a harmonic generator. In this case the output frequency of the master oscillator is also harmonically related to the harmonic generator.

The disadvantage of the harmonic generator methods is the unavoidable generation of spurious frequencies in the combining mixers. Selection of the desired harmonics frequency while simultaneously rejecting the adjacent undesired harmonics and spurious frequencies is a difficult problem which requires extensive filtering. Such filtering becomes more extensive as the channel spacing is decreased. Furthermore, the number of signal frequencies that a harmonic generator is capable of providing is restricted by the actual number of harmonics and subharmonics available.

The present invention contemplates a system wherein a large multiplicity of highly accurate output signal frequencies are made available from a single variable frequency oscillator.

The present invention contemplates a system wherein the duration of a variable gate pulse is controlled as a function of a selected frequency and is constrained to equal the duration of a standard gate pulse for the selected frequency. Upon selection of a different frequency deviation of the variable gate pulse's duration from that of the standard gate pulse results in an error voltage which is utilized to control the variable frequency oscillator to bring the output of the variable frequency oscillator to the newly selected frequency. Also, the system of the present invention functions in the same manner to maintain the output of the variable frequency oscillator at the selected frequency.

Therefore, it is an object of the present invention to provide a frequency synthesizer for generating a large multiplicity of output signal frequencies from a single variable frequency oscillator wherein the spacing between channels may be decreased to a minimum without adversely affecting the quality of the signal frequency generated.

Another object of the present invention is to provide a frequency synthesizer for use in radio communications systems wherein the need for filtering the output signal is eliminated since spurious frequencies are not generated.

A further object of the present invention is to provide a frequency synthesizer wherein a desired output frequency may be selected and accurately maintained by the same circuitry.

A still further object of the present invention is to provide a frequency synthesizer for producing any desired signal frequency from a large number of possible frequencies from a variable frequency oscillator and wherein the desired frequency may be accurately selected and maintained without extensive filtering of the output signal frequency or expensive maintenance and alignment thereof.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
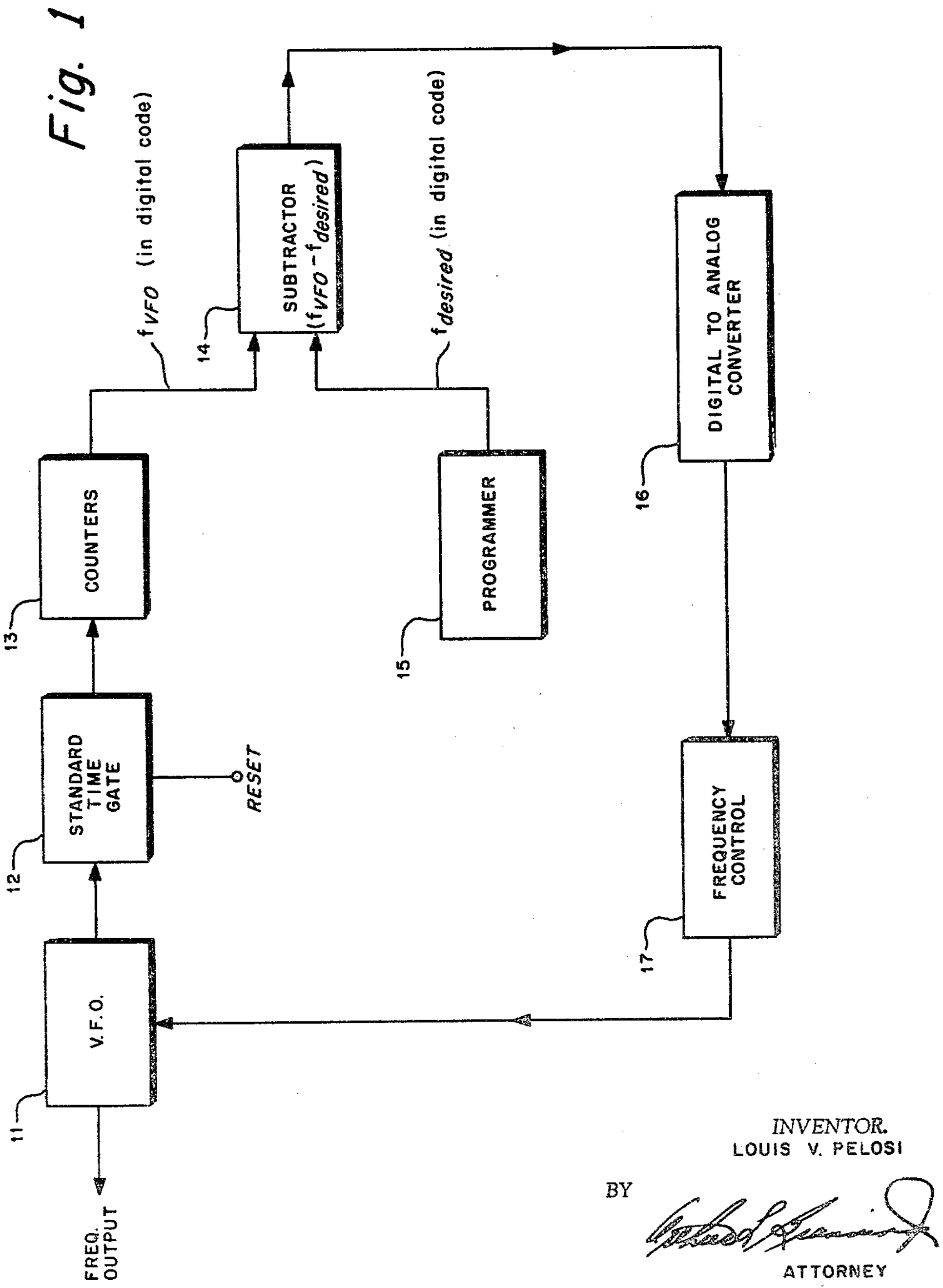
FIG. 1 illustrates in block diagram form one general embodiment of the present invention.

FIG. 1 best illustrates the principle of the present invention and represents one form of the implementation thereof. Variable frequency oscillator 11 having a frequency range of $f_1$ to $f_2$ has an output connected to standard time gate 12. Standard time gate 12 is an exact time gate which is opened for a predetermined time interval by a reset pulse. After a predetermined time of, for example, one second the gate automatically closes. Standard time gate 12 is connected to counter 13 which counts the cycles of the variable frequency oscillator frequency 11 during the time interval that standard time gate 12 is open. Therefore, standard time gate 12 and counter 13 together act as a frequency digital converter and a storage means for the count therein. Upon completion of the count during the gate interval the frequency is stored in the counter circuit as a digital code for example, 1001011. The output of counter 13 which is a digital code representing the frequency of the variable frequency oscillator is connected as an input to substractor circuit 14. Subtractor circuit 14 has a second input from programmer 15 which provides an input in digital code into subtractor 14 representative of the frequency at which it is desired to have the variable frequency oscillator operate. Subtractor 14 operates in digital format and subtracts the frequency desired from the frequency of the variable frequency oscillator and provides an input to digital-to-analog converter 16, known in the art, which converts the difference between the two frequencies into an analog voltage. The analog voltage is an error voltage and represents deviation of the frequency of the variable frequency oscillator from that of the desired frequency as put in and selected by programmer 15. This error voltage is supplied as an input to frequency control 17 which has an output connected to variable frequency oscillator 11 which causes variable frequency oscillator 11 to attain the selected frequency and thereby cancel out the error voltage. In other words, the variable frequency oscillator is caused to oscillate at a frequency which is the same as the frequency set on the programmer 15. The output of the variable frequency oscillator may be directly fed to any desired utilization circuit. Standard time gate 12 may be pulsed and reset at regular intervals and after the desired frequency output of variable frequency oscillator 11 has been attained, the circuit of the present invention functions as a means to continuously maintain the output of variable frequency oscillator equal to the frequency selected by progammer 15. The variable frequency oscillator 11 and frequency control 17 utilized above are of the type described by MIL Handbook 215; Selected Circuits, pages 5–38. The subtractor 14 is of the type described in the text "Understanding Digital Computers" by Paul Siegel; published by J. Wiley and Son, 1961, page 308.

Figure 2:
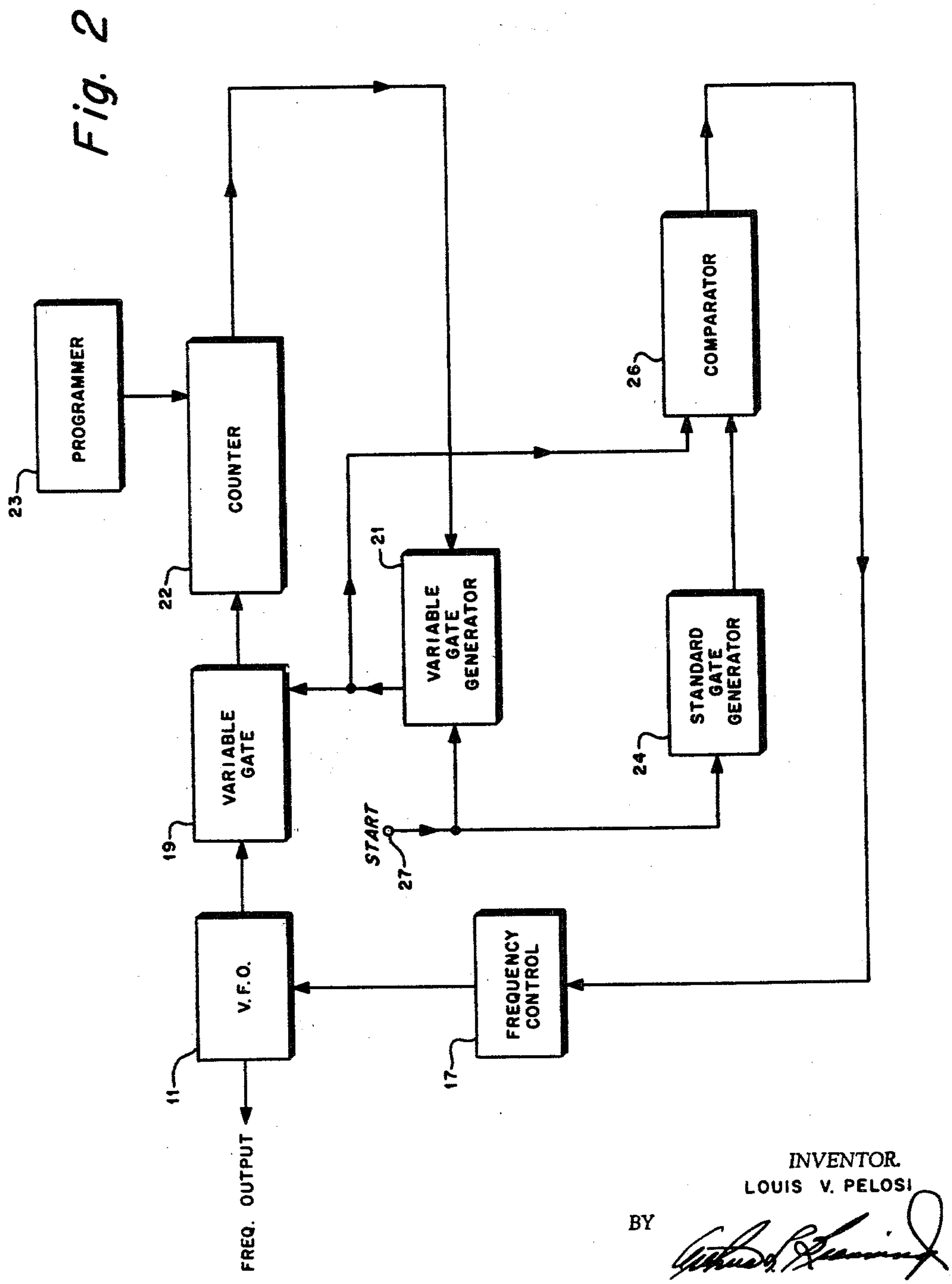
FIG. 2 illustrates in block diagram form a second embodiment of the present invention.

FIG. 2 illustrates a second embodiment of the present invention wherein the output of variable frequency oscillator 11 is connected to variable gate 19 which on receiving a gate pulse from variable gate generator 21 allows the frequency output of variable frequency oscillator 11 to be fed to counter 22. The counter may be of the type which generates an otput pulse after counting a predetermined and preset number of counts and which corresponds to the maximum count capability of the counter. After counter 22 has counted a predetermined number of cycles of the frequency from variable frequency oscillator 11 it provides an output stop pulse to variable gate generator 21. The count at which counter 22 emits an output pulse may be effectively controlled by a programmer 23 similar to that described above which may insert a predetermined count into counter 22 so that when that count is added to the cycles which are counted from variable frequency oscillator 11, variable gate generator 21 receives the stop pulse from counter 22. In other words, the inserted predetermined count is equal to the complement of the desired frequency as determined by the maximum count capability of the counter. The output of the variable gate generator 21 is fed to comparator circuit 26 as well as to variable gate 19. Comparator circuit 26 has a second input from standard gate generator 24. Standard gate generator 24 and variable gate generator 21 receive a start pulse simultaneously from a convenient source such as a multivibrator, not shown, applied to terminal 27 for starting the cycle. Comparator 26 provides an output which is proportional to the difference between the widths of the gate pulses from variable gate generator and standard gate generator 24. There, of course, will be no output from comparator 26 when the respective pulse widths are equal.

The output of comparator circuit 26, which is an error voltage, is fed to frequency control 17 which controls the output of variable frequency oscillator 11. For example, standard gate generator 24 is set to provide a gate pulse which is exactly equal to one second. Therefore, the circuit of the present invention functions to cause variable gate generator 21 to provide a gate pulse exactly equal to one second. However, the output from variable frequency oscillator 11 that does this may be varied. Thus, if counter 22 provides an output pulse after it has counted say 1,000,000 cycles from variable frequency oscillator 11, variable frequency oscillator 11 will be continuously caused to oscillate at that frequency. However, by inserting a count via programmer 23 into counter 22, counter 22 may be caused to emit an output pulse after it has actually received from variable frequency oscillator 11 only one pulse or two pulses or 999,999 pulses wherein each cycle of the signal frequency output is considered a pulse. In other words, the output from variable frequency oscillator 11 may be selectively varied according to the count inserted into counter 22 by programmer 23.

A start pulse is applied simultaneously to the variable gate generator 21 and standard gate generator 24. The output of variable frequency oscillator is applied through the gate 19 to counter 22. An output pulse from counter 22 is fed back to close the variable gate generator 21 when counter 22 has counted the selected count. When the frequency of the variable frequency oscillator 11 equals the desired frequency, the variable gate generator 21 provides a gate pulse exactly equal to the gate pulse of standard gate generator 24. If the frequency of the variable frequency oscillator 11 is too high, the gate pulse from variable gate generator 21 will be less than that from the standard gate generator 24. If the variable frequency oscillator 11 is too low, the variable gate generator 21 provides a gate pulse having a greater width than that from the standard gate generator 24. The widths of the standard gate pulse and the variable gate pulse are compared in comparator circuit 26 and an error voltage obtained therefrom is fed back to the frequency control 17. The complete cycle is continuously repeated to maintain the desired frequency output from variable frequency oscillator 11 by constantly recurring start pulses from a convenient source not shown applied at terminal 27. For purposes of illustration and not limitation the following discussion is a simplified example of various performance cycles. Decimal counters, such as 22, are capable of reading a maximum count of $10^n$, where $n$ is the number of decade counters. If $n$ is equal to two (2), then the counter has a 100 count capability and a 0–100 cycle control of the variable frequency oscillator. If the frequency output desired from the v.f.o. is eighty (80) cycles per second (c.p.s.) then the programmer is manually set at 80 indicated which actually presets the counter with the complement of 80 or 20 counts (100–80). If the v.f.o. output is actually 80 counts per second then 80 counts or cycles from the v.f.o. will generate an output pulse. This occurs since the counter provides an output stop pulse at 100 counts (the maximum count capability) and 20 counts had been preset. Therefore a one second gate (or zero error) will be generated by the variable gate generator 21.

If the v.f.o. provides an output of 90 counts per second and 80 is desired then the counter 22 is again preset by programmer 23 with 20 counts (100–80) and after 80 counts are received from the v.f.o., thereby causing 100 counts, the counter will provide an output stop pulse. The gate width generated under these circumstances is less (eight-ninths) than the one second standard gate whereby an error signal is produced from comparator 26.

If the v.f.o. provides an output of 60 counts per second and 80 counts or cycles are desired then the counter is again preset by programmer 23 with 20 counts (100–80) and after 80 counts are received (60 from first cycle taking one second and 20 from the next cycle taking an additional one-third of a second) the counter will provide an output stop pulse. The gate width generated under these circumstances is greater (eight-sixths) than the one second standard gate generated by generator 24. Here again, this produces an error signal at the comparator 26.

Figure 3:
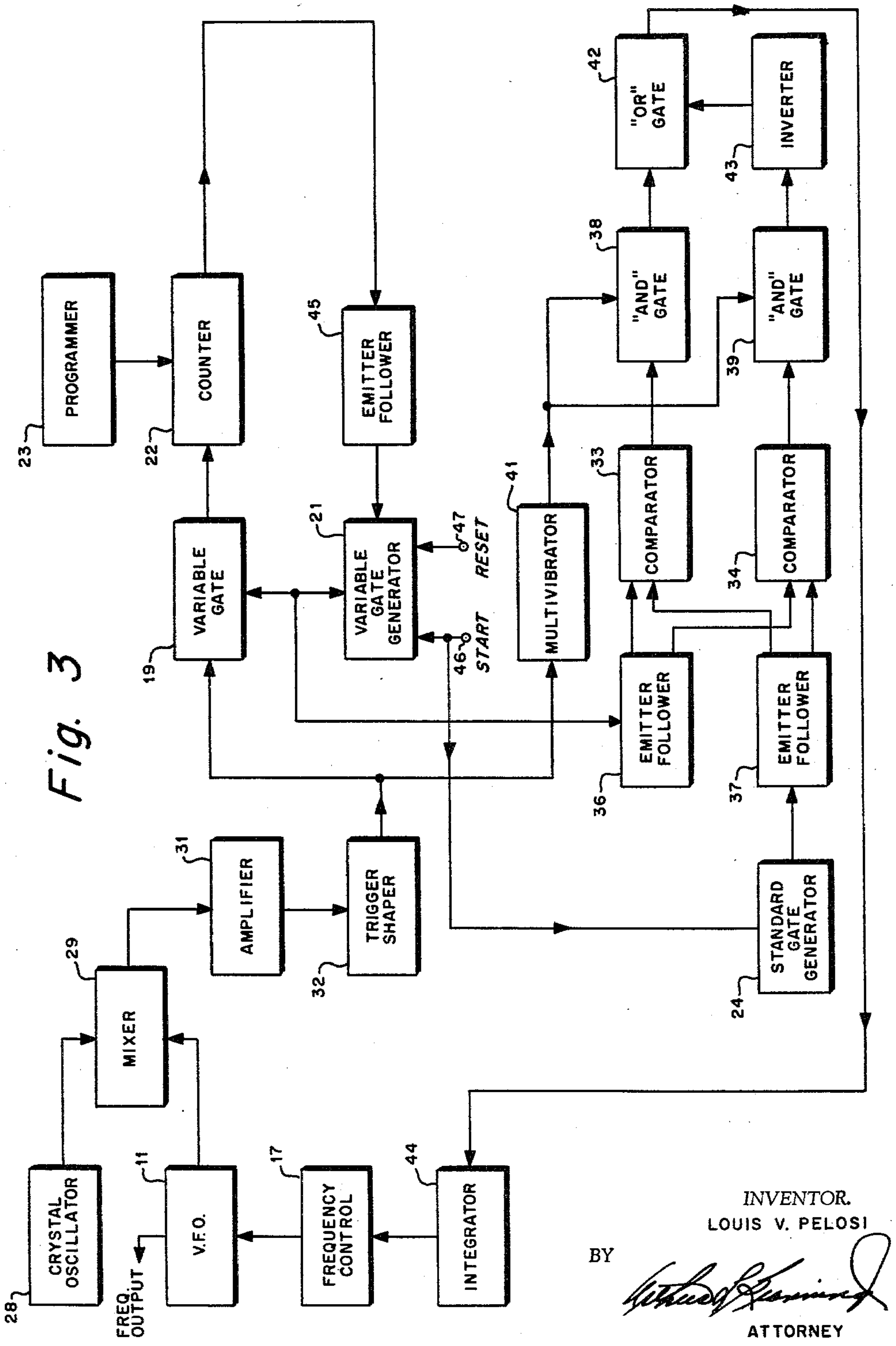
FIG. 3 illustrates in block diagram form a third embodiment of the present invention.

FIG. 3 illustrates a third embodiment of the present invention wherein a crystal oscillator 28 is used in conjunction with variable frequency oscillator 11.

The present state of the art provides variable frequency oscillators with a range of 0 to 10 megacycles. However, present day counters cannot effectively handle such a wide range of frequencies and still provide the highly accurate results called for in this invention. However, any desired frequency range may be obtained by heterodyning one output of variable frequency oscillator 11 with that of a stable crystal oscillator 28 to obtain a difference frequency output within the range of the counters. For example, if the crystal oscillator frequency equals one megacycle, the variable frequency oscillator 11 may operate in a range of 0.9 to 1 megacycle to provide a mixer output frequency which varies from 0 to 100 kilocycles.

This method for bringing the frequency down to a magnitude which may be handled by present day counters is utilized in the embodiment shown in FIG. 3. Crystal oscillator 28 has an output which is mixed with the output of variable frequency oscillator 11 in mixer 29. The output of the mixer may, as discussed above, vary from 0 to 100 kilocycles as the variable frequency oscillator's output is in the range of from 1 megacycle to 900 kilocycles. The output from mixer 29 is amplified in amplifier 31 and is shaped into trigger pulses in shaper 32.

As in the circuit illustrated in FIG. 2 a start pulse is applied simultaneously to the variable gate generator 21 and standard gate generator 24. The output of variable gate generator 21 is effectively fed to comparators 33 and 34 via an emitter follower circuit 36. The standard gate pulse from standard gate generator 24 is fed to comparators 33 and 34 effectively via emitter follower circuit 37. The output of comparator circuit 33 is a pulse having a duration which is proportional to the amount that the standard gate pulse exceeds in width the variable gate pulse. The output of comparator circuit 34 is a pulse having a duration which is proportional to the amount that the variable gate generator pulse exceeds in width the standard gate pulse. The output of comparator 33 is fed to "and" gate 38 while the output of comparator circuit 34 is fed to "and" gate 39.

The output of trigger shaper circuit 32 is fed as an input to one count multivibrator 41. The output of multivibrator 41 consists of pulses five microseconds in width with a period equal to the period of the particular frequency output of mixer 29. This provides a single pulse output five microseconds wide for each cycle that the variable frequency oscillator is above or below the desired frequency. Thus, when the frequency is high "and" gate 38 is opened the "five microsecond wide" pulses are passed to "or" gate 42 and thence to integrator 44. The error voltage output of integrator 44 is then proportional to the amount by which the variable gate pulse is less than the standard gate pulse. Variable frequency oscillator 11 is accordingly adjusted to the selected frequency via frequency control 17.

If the variable gate pulse is greater than the standard gate pulse, "and" gate 39 instead of "and" gate 38 is opened and the pulses from multivibrator 41 pass therethrough to inverter 43. After inversion the pulses are passed through "or" gate 42 to integrator 44 wherein the above-described correction of variable frequency oscillator 11 is performed.

The cycle may be continuously repeated by reapplication of the reset and start pulses to maintain a continuous frequency control of the variable frequency oscillator 11. In other words, any particular frequency may be selected for variable frequency oscillator 11 initially by properly setting the programmer 23 and thereafter maintained by recycling the system at predetermined intervals of time.

It is noted that the embodiment of the present invention as shown in FIG. 3 would function efficiently without the emitter followers 36, 37 and 45 which were included to provide sharply defined pulses in a practical model.

Various other modifications of the present invention are possible without departing from the spirit of the present invention and those modifications shown should not be construed as limiting the invention beyond the express limitations as set forth in the claim.

What is claimed is:

A system for providing a multiplicity of selectable frequency output signals, comprising in combination:

variable frequency oscillator means, frequency control means connected to said variable frequency oscillator means for varying the output frequency of said variable frequency oscillator, crystal oscillator means, mixer means connected to said frequency oscillator means and said crystal oscillator means providing a frequency output signal lower than the frequency output of said variable frequency oscillator means, shaping circuit means connected to said mixer for shaping the output from said mixer into trigger pulses, means connected to said mixer for deriving a control voltage therefrom, counter means providing an output pulse after a predetermined count, programmer means connected to said counter means for inserting a selected count into said counter means to cause said counter to emit said output pulse when the sum of the count from said shaping circuit means and said programmer means equals said predetermined count, gate means connected between said shaping circuit means and said counter means for passing the output of said shaping circuit means to said counter means, variable gate generator means for generating a pulse of variable duration, standard gate generator means for generating a pulse of predetermined duration, terminal means for supplying a start pulse to said variable gate generator means and said standard gate generator means, first conductor means connecting said counter means to said variable gate generator means for cutting off said variable gate pulse when said counter means reaches said predetermined count, second conductor means connecting said variable gate generator means to said gate means for opening said gate means for the duration of said variable gate pulse, a first comparator circuit connected to said variable gate generator means and said standard gate generator means providing a first output pulse proportional to the amount the duration of said variable gate pulse exceeds the duration of said standard gate pulse, a second comparator circuit connected to said variable gate generator means and said standard gate generator means providing a second output pulse proportional to the amount the duration of said standard gate pulse exceeds the duration of said variable gate pulse, and circuit means connected between said first comparator circuit means and said frequency control means and receiving said control voltage for converting said first output pulse from said first comparator circuit to a voltage whereby the frequency output of said variable frequency oscillator means is decreased to cause said pulse durations to become equal, said circuit means connected between said second comparator circuit means and said frequency control means and receiving said control voltage for converting said second output pulse from said second comparator circuit to a voltage whereby the frequency output of said variable frequency oscillator means is increased to cause said pulse durations to become equal.

References Cited by the Examiner

UNITED STATES PATENTS 2,490,500 12/49 Young ---------------- 331—25

ROY LAKE, *Primary Examiner.*

JOHN KOMINSKI, *Examiner.*